United States Patent
Hamada et al.

(10) Patent No.: US 8,411,993 B2
(45) Date of Patent: Apr. 2, 2013

(54) APPARATUS AND METHOD FOR REDUCING IMAGE NOISE

(75) Inventors: Masao Hamada, Fukuoka (JP); Tadanori Tezuka, Fukuoka (JP)

(73) Assignee: Panasonic Corporation, Osaka (JP)

( * ) Notice: Subject to any disclaimer, the term of this patent is extended or adjusted under 35 U.S.C. 154(b) by 112 days.

(21) Appl. No.: 12/863,869

(22) PCT Filed: Nov. 30, 2009

(86) PCT No.: PCT/JP2009/006466
§ 371 (c)(1),
(2), (4) Date: Jul. 21, 2010

(87) PCT Pub. No.: WO2010/073488
PCT Pub. Date: Jul. 1, 2010

(65) Prior Publication Data
US 2011/0235941 A1    Sep. 29, 2011

(30) Foreign Application Priority Data
Dec. 22, 2008 (JP) ................................. 2008-325211

(51) Int. Cl.
*G06K 9/40* (2006.01)

(52) U.S. Cl. ........................................................ 382/275

(58) Field of Classification Search .................. 382/254, 382/260, 275; 348/254, 533
See application file for complete search history.

(56) References Cited

U.S. PATENT DOCUMENTS

| 4,635,120 | A   |   | 1/1987  | Ichinoi |          |
|-----------|-----|---|---------|---------|----------|
| 2005/0248687 | A1 | * | 11/2005 | Lee et al. | 348/606 |
| 2007/0024748 | A1 |   | 2/2007  | Kubota  |          |
| 2007/0236609 | A1 | * | 10/2007 | Pathak et al. | 348/620 |
| 2010/0253811 | A1 | * | 10/2010 | On      | 348/241  |

FOREIGN PATENT DOCUMENTS

| JP | 61-25377    | 2/1986  |
| JP | 2-248173    | 10/1990 |
| JP | 2000-278557 | 10/2000 |
| JP | 2001-136416 | 5/2001  |
| JP | 2007-60636  | 3/2007  |
| JP | 2008-153726 | 7/2008  |
| WO | 2007/117623 | 10/2007 |

OTHER PUBLICATIONS

International Search Report issued Feb. 2, 2010 in corresponding International Application No. PCT/JP2009/006466.

* cited by examiner

*Primary Examiner* — Amara Abdi
(74) *Attorney, Agent, or Firm* — Wenderoth, Lind & Ponack, L.L.P.

(57) ABSTRACT

A spatial noise reducing section 20 calculates a spatial NR pixel value Snr by reducing spatial noise from an input pixel value Pin. A temporal noise reducing section 30 calculates a temporal NR pixel value Tnr by reducing temporal noise from the input pixel value Pin. A temporal noise reduction result determining section 50 compares the magnitude of the pixel values among the input pixel value Pin, the spatial NR pixel value Snr, and the temporal NR pixel value Tnr, and outputs, based on the comparison result, one of the pixel values as a noise reduction result (an output pixel value Pout). Thus, it is made possible to perform strong temporal noise reduction on a moving image while preventing generation of residual images in a motion image area.

7 Claims, 8 Drawing Sheets

APPARATUS AND METHOD FOR REDUCING IMAGE NOISE

TECHNICAL FIELD

The present invention relates to an apparatus and a method for reducing image noise, and more particularly, to an apparatus and a method for reducing image noise, which facilitate effective reduction of noise in a moving image.

BACKGROUND ART

A moving image shot by an imaging device such as a digital video camera or a digital still camera, includes noise attributable to the shooting environment or characteristics of an image sensor. Examples of noise include photon shot noise, dark noise, fixed pattern noise, and circuit noise or the like. Because such noise deteriorates the quality of an image (image quality), noise reduction (NR) is performed to remove (or reduce) the noise in the moving image.

A well-known noise reduction method is a method of smoothing a pixel value of a target pixel, which is a processing target, using pixel values of neighboring pixels of the target pixel. For smoothing a pixel value, for example, used is a method of obtaining an average of the values of the target pixel and the neighboring pixels, or a method of obtaining a median (median filter) of the values of the target pixel and the neighboring pixels. In these methods, noise reduction is performed in a spatial direction using pixel values within one image frame, and thus is called spatial noise reduction.

For a moving image, known is a method of smoothing a pixel value of a target pixel, using correlations among a plurality of images that are successive in a temporal direction. For smoothing a pixel value, for example, used is a method of obtaining a weighted average of the pixel value of the target pixel and a pixel value at the same coordinates in a temporally preceding image. In this method, noise reduction is performed in the temporal direction using pixel values in a plurality of image frames, and thus is called temporal noise reduction.

In addition, as a combinational method of the spatial noise reduction and the temporal noise reduction, there exists a technology which, based on a motion detection result of a moving image, selects the temporal noise reduction when a target pixel is in a motionless image area and selects the spatial noise reduction when the target pixel is in a motion image area (for example, see Patent Literature 1).

CITATION LIST

Patent Literature

[PTL 1] Japanese Patent Laid-Open Publication No. H02-248173

SUMMARY OF INVENTION

Technical Problem

Even in the above-described method of switching between the spatial noise reduction and the temporal noise reduction, in order to increase the effect of the temporal noise reduction, strong smoothing needs to be performed in the temporal direction of the moving image. However, performing strong smoothing in the temporal direction of the moving image may generate residual images in the periphery of the motion image area, resulting in deterioration of the image quality. In other words, there is a tradeoff between preventing generation of residual images in the motion image area and performing strong smoothing in the temporal direction of the moving image, thereby causing a problem that the effect of the temporal noise reduction on the moving image cannot be sufficiently increased.

Therefore, an object of the present invention is to provide an apparatus and a method for reducing image noise, which are capable of performing strong temporal noise reduction on a moving image while preventing generation of residual images in a motion image area.

Solution to Problem

The present invention is directed to an apparatus for reducing image noise, which reduces noise in an image. To achieve the above object, the apparatus for reducing image noise of the present invention includes: a spatial noise reducing section that reduces noise from an input image by smoothing a pixel value in a spatial direction within a current image frame; a temporal noise reducing section that reduces noise from the input image by smoothing the pixel value in a temporal direction between the current image frame and a temporally preceding image frame; a pixel value range setting section that sets a pixel value range based on the pixel value of the input image and a pixel value of an image outputted by the spatial noise reducing section; and a range determining section that outputs: a pixel value of an image outputted by the temporal noise reducing section when the pixel value of the image outputted by the temporal noise reducing section is within the pixel value range; a maximum value of the pixel value range when the pixel value of the image outputted by the temporal noise reducing section is greater than the maximum value; and a minimum value of the pixel value range when the pixel value of the image outputted by the temporal noise reducing section is less than the minimum value.

The pixel value range setting section may include: a difference value calculating section that calculates a difference value between the pixel value of the input image and the pixel value of the image outputted by the spatial noise reducing section; a margin setting section that obtains two margin values by multiplying a predetermined margin rate for spatial noise reduction and a predetermined margin rate for an input image each by the difference value; and an adding section that, based on a sign of the difference value, adds one of the two margin values to the pixel value of the input image to obtain the maximum value of the pixel value range, and adds the other of the two margin values to the pixel value of the input image to obtain the minimum value of the pixel value range.

The pixel value range setting section may include: a selecting section that compares the pixel value of the input image and the pixel value of the image outputted by the spatial noise reducing section to select the maximum value and the minimum value of the pixel value range; a margin setting section in which a margin value is predetermined; and an adding section that adds the predetermined margin value to each of the maximum value and the minimum value of the pixel value range. This configuration may further include a difference absolute value calculating section that calculates the absolute value of the difference between the pixel value of the input image and the pixel value of the image outputted by the spatial noise reducing section, thereby providing the adding section with a margin value multiplied by the absolute value of the difference.

Processes performed by respective components included in the above-described apparatus for reducing image noise can be regarded as a method for reducing image noise, which provides a series of procedures. This method may be provided in the form of a program to cause a computer to execute the series of procedures. This program may be recorded in a computer-readable recording medium to be introduced to the computer. Further, each component of the apparatus for reducing image noise may be realized as an LSI which is an integrated circuit.

Advantageous Effects of Invention

According to the present invention, by determining the reliability of a temporal noise reduction process based on a pixel value before noise reduction and a pixel value obtained after spatial noise reduction, strong temporal noise reduction can be performed on a moving image while preventing generation of residual images in a motion image area.

DESCRIPTION OF EMBODIMENTS

An embodiment of the present invention will be described with reference to the drawings.

Figure 1:
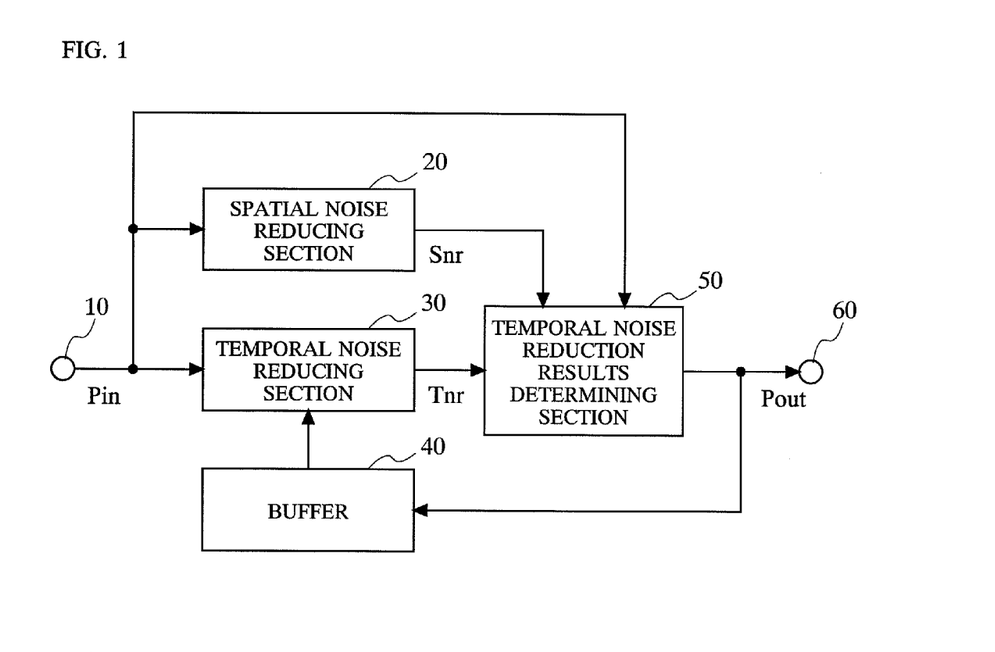
FIG. 1 is a diagram showing a configuration of an apparatus for reducing image noise according to an embodiment of the present invention.

FIG. 1 shows a configuration of an apparatus for reducing image noise according to the embodiment of the present invention. In FIG. 1, the apparatus for reducing image noise according to the present embodiment includes a spatial noise reducing section 20, a temporal noise reducing section 30, a buffer 40, and a temporal noise reduction result determining section 50.

First, a general outline of the apparatus for reducing image noise of the present invention having the above configuration will be described.

A moving image is inputted to each of the spatial noise reducing section 20, the temporal noise reducing section 30, and the temporal noise reduction result determining section 50 via an input terminal 10. The spatial noise reducing section 20 performs smoothing on pixels of the inputted moving image, using a pixel value of a target pixel and pixel values of neighboring pixels, so that noise is reduced in a spatial direction within one image frame. The temporal noise reducing section 30 performs smoothing on pixels of the inputted moving image, using a pixel value of a target pixel in a current image frame and a pixel value of a pixel at the same coordinates in a temporally preceding image frame that is stored in the buffer 40, so that noise is reduced in a temporal direction between the two image frames.

The temporal noise reduction result determining section 50 first receives: a pixel value of the inputted moving image (hereinafter referred to as an input pixel value Pin); a pixel value which is obtained by reducing spatial noise from the input pixel value Pin and which is outputted from the spatial noise reducing section 20 (hereinafter referred to as a spatial NR pixel value Snr); and a pixel value which is obtained by reducing temporal noise from the input pixel value Pin and which is outputted from the temporal noise reducing section 30 (hereinafter referred to as a temporal NR pixel value Tnr). Then, the temporal noise reduction result determining section 50 outputs, as a noise reduction result, a pixel value that is determined based on the magnitude of these pixel values (hereinafter referred to as an output pixel value Pout) to an output terminal 60. The output pixel value Pout that is outputted from the temporal noise reduction result determining section 50 is stored temporarily in the buffer 40 to be used sequentially in a process performed by the temporal noise reducing section 30.

Next, a specific operation of the temporal noise reduction result determining section 50 is described.

Figure 2:
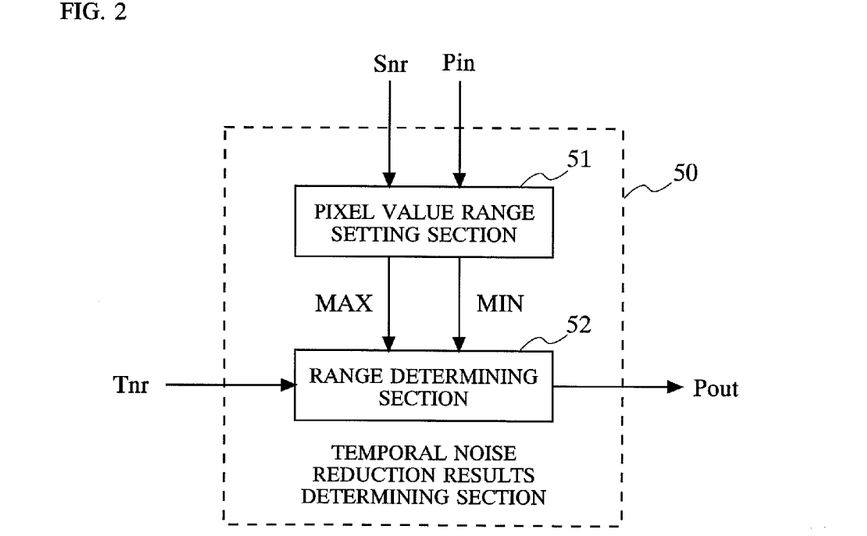
FIG. 2 is a diagram showing a detailed configuration example of a temporal noise reduction result determining section 50.

FIG. 2 shows a detailed configuration example of the temporal noise reduction result determining section 50 shown in FIG. 1. In FIG. 2, the temporal noise reduction result determining section 50 includes a pixel value range setting section 51 and a range determining section 52.

The pixel value range setting section 51 first receives an input pixel value Pin and a spatial NR pixel value Snr, and then outputs the greater of the two pixel values as a maximum value MAX and outputs the smaller of the two pixel values as a minimum value MIN to the range determining section 52. Specific configuration examples of the pixel value range setting section 51 are shown in FIGS. 3 to 6.

Configuration Example 1

Figure 3:
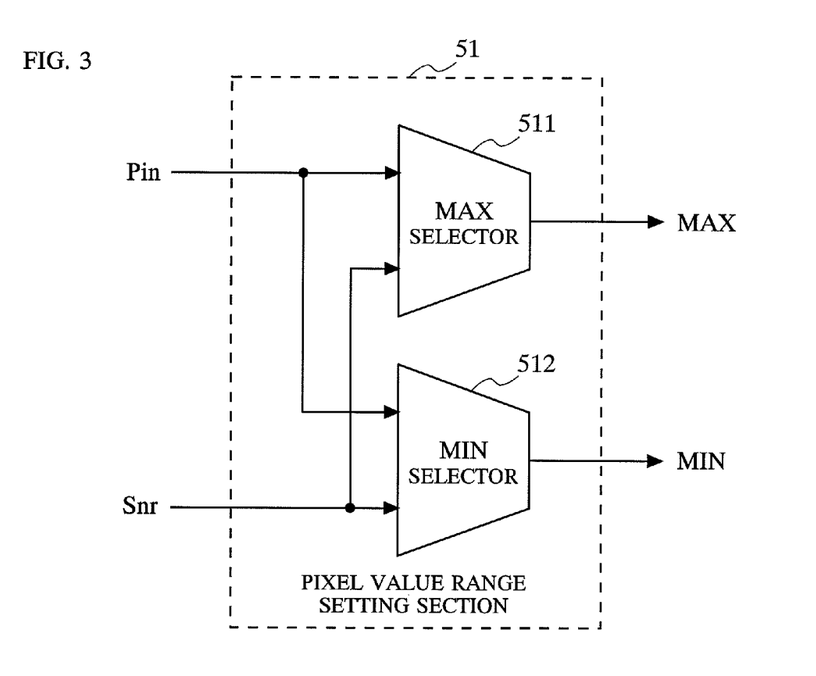
FIG. 3 is a diagram showing a specific configuration example 1 of a pixel value range setting section 51.

A pixel value range setting section 51 shown in FIG. 3 includes in its configuration a MAX selector 511 and a MIN selector 512. The MAX selector 511 outputs either an input pixel value Pin or a spatial NR pixel value Snr, whichever is greater. The MIN selector 512 outputs either the input pixel value Pin or the spatial NR pixel value Snr, whichever is smaller. With this configuration, a maximum value MAX and a minimum value MIN can be obtained.

Configuration Example 2

Figure 4:
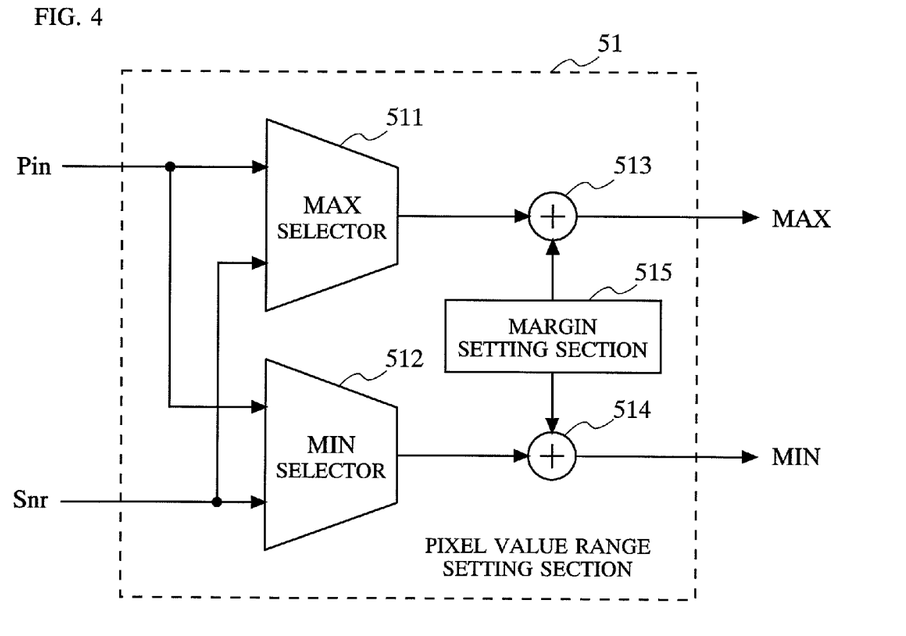
FIG. 4 is a diagram showing a specific configuration example 2 of the pixel value range setting section 51.

A pixel value range setting section 51 shown in FIG. 4 further includes in its configuration, in addition to the configuration example 1 in FIG. 3, an adder 513, an adder 514, and a margin setting section 515. The margin setting section 515 outputs predetermined margin values respectively to the adders 513 and 514. The adder 513 adds or subtracts a margin value to or from a maximum value MAX that is outputted by the MAX selector 511. The adder 513 adds or subtracts a margin value to or from a minimum value MIN that is outputted by the MIN selector 512. The margin values may be the same for the maximum value MAX and for the minimum value MIN, or they may be different. With this configuration, a maximum value MAX and a minimum value MIN can be changed as intended.

Configuration Example 3

Figure 5:
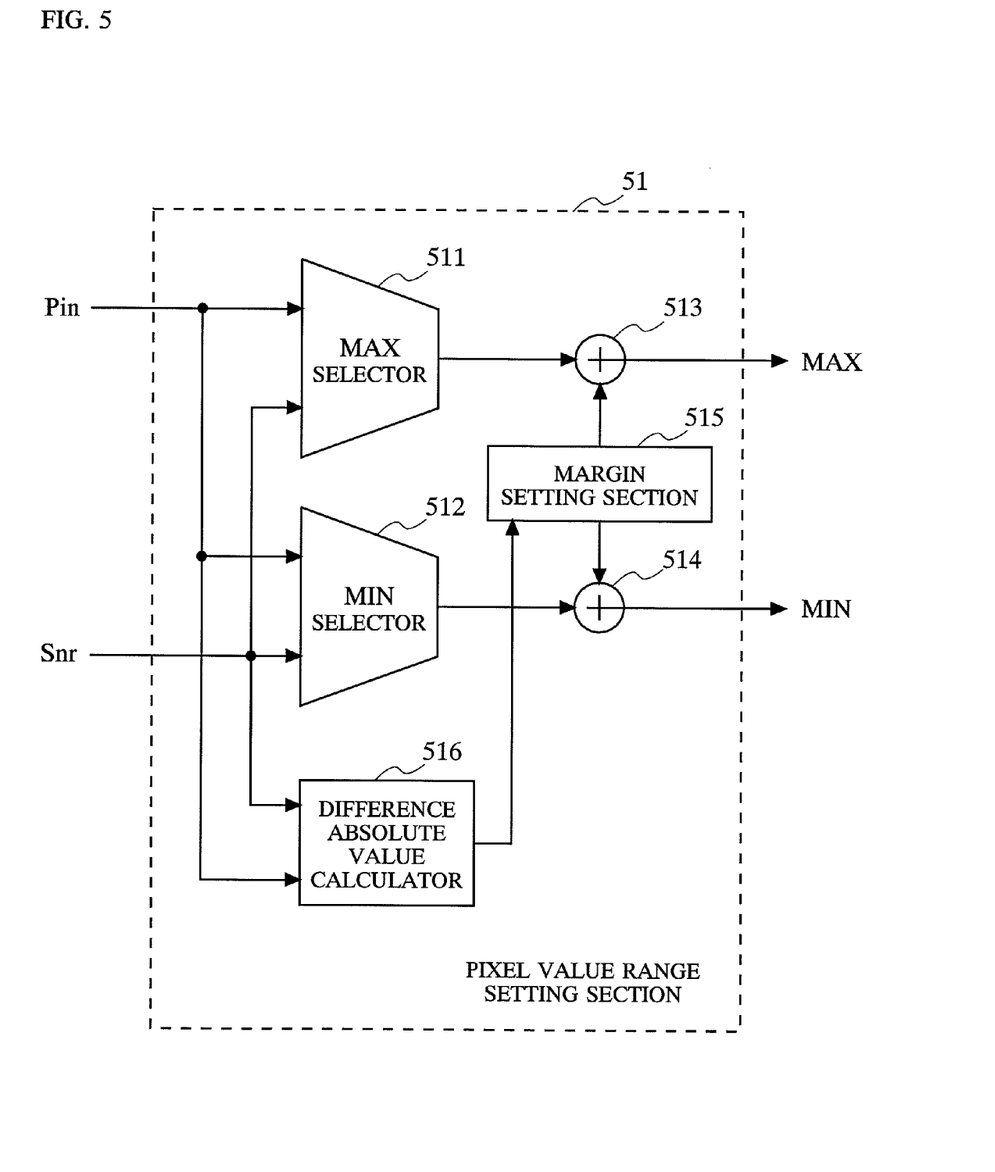
FIG. 5 is a diagram showing a specific configuration example 3 of the pixel value range setting section 51.

A pixel value range setting section 51 shown in FIG. 5 further includes in its configuration, in addition to the configuration example 2 in FIG. 4, a difference absolute value calculator 516. The difference absolute value calculator 516 calculates the absolute value of the difference between the input pixel value Pin and the spatial NR pixel value Snr. The margin setting section 515 outputs, respectively to the adders 513 and 514, values obtained by multiplying predetermined margin values each by the absolute value of the difference calculated by the difference absolute value calculator 516. With this configuration, a maximum value MAX and a minimum value MIN can be changed as intended while being kept in proportion to the difference between the input pixel value Pin and the spatial NR pixel value Snr.

Configuration Example 4

Figure 6:
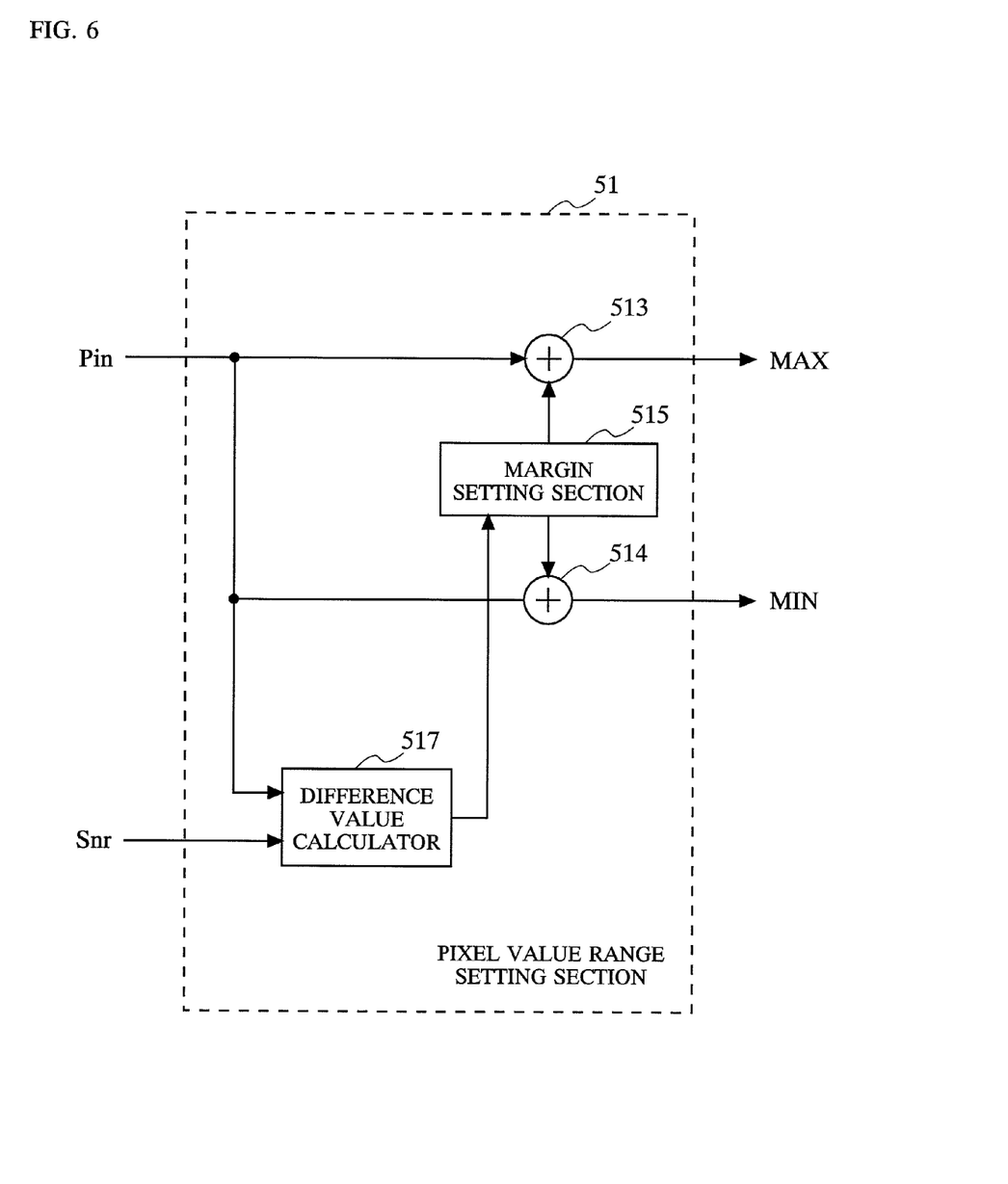
FIG. 6 is a diagram showing a specific configuration example 4 of the pixel value range setting section 51.

A pixel value range setting section 51 shown in FIG. 6 includes in its configuration an adder 513, an adder 514, a margin setting section 515, and a difference value calculator 517. The difference value calculator 517 calculates a difference value by subtracting an input pixel value Pin from a spatial NR pixel value Snr. In the margin setting section 515, a margin rate for the spatial NR pixel value and a margin rate for the input pixel value are predetermined. When the difference value calculated by the difference value calculator 517 is positive, the margin setting section 515 outputs to the adder 513 a margin value obtained by multiplying the difference value by the margin rate for the spatial NR pixel value. From the adder 513, a maximum value MAX is outputted. In addition, the margin setting section 515 outputs to the adder 514 a margin value obtained by multiplying the difference value by the margin rate for the input pixel value. From the adder 514, a minimum value MIN is outputted. On the other hand, when the difference value calculated by the difference value calculator 517 is negative, the margin setting section 515 outputs to the adder 513 a margin value obtained by multiplying the difference value by the margin rate for the input pixel value. In addition, the margin setting section 515 outputs to the adder 514 a margin value obtained by multiplying the difference value by the margin rate for the spatial NR pixel value. With this configuration, a maximum value MAX and a minimum value MIN can be changed as intended while being kept in proportion to the difference between the input pixel value Pin and the spatial NR pixel value Snr. To change the increase or decrease direction of the maximum value MAX so that it opposes the increase or decrease direction of the minimum value MIN, a negative sign may be put in the front of either the margin rate for the spatial NR pixel value or the margin rate for the input pixel value.

Figure 7:
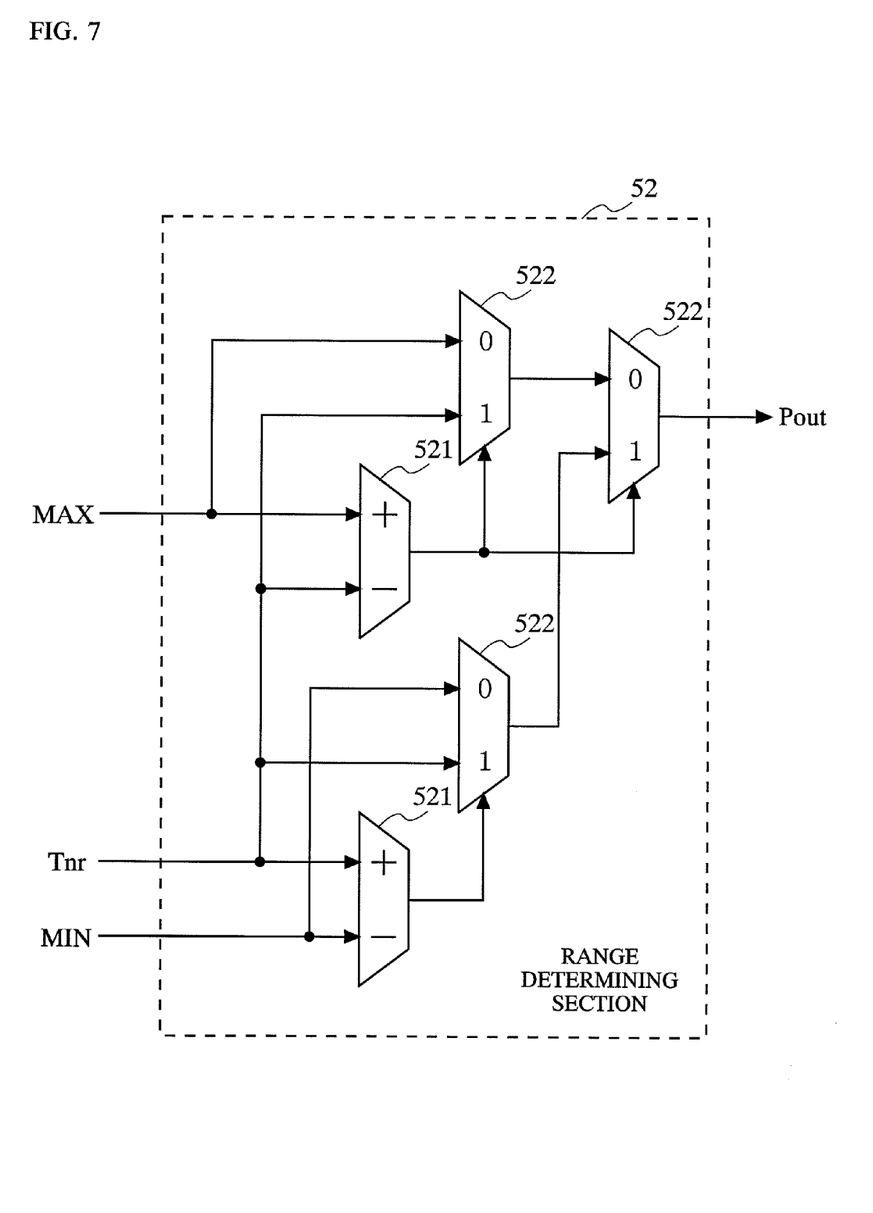
FIG. 7 is a diagram showing a specific configuration example of a range determining section 52.

Reference is made again to FIG. 2. The range determining section 52 first receives a maximum value MAX, a minimum value MIN, and a temporal NR pixel value Tnr. Then, the range determining section 52 outputs, as an output pixel value Pout: the temporal NR pixel value Tnr when the temporal NR pixel value Tnr is between the maximum value MAX and the minimum value MIN; the maximum value MAX when the temporal NR pixel value Tnr is greater than or equal to the maximum value MAX; and the minimum value MIN when the temporal NR pixel value Tnr is less than or equal to the minimum value MIN. A specific configuration example of the range determining section 52 is shown in FIG. 7. In FIG. 7, a comparator 521 outputs, as a comparison signal: a logical value "1" when a pixel value inputted to a "+ terminal" is greater than a pixel value inputted to a "− terminal"; and a logical value "0" in other cases. A selector 522, in accordance with the comparison signal which is outputted from the comparator 521, selects and outputs a pixel value to be inputted to a "1 terminal" in the case of the logical value "1", and selects and outputs a pixel value to be inputted to a "0 terminal" in the case of the logical value "0".

Description will be made of a principle in which the above configuration enables strong temporal noise reduction on a moving image while preventing generation of residual images in a motion image area. The process of the present invention is based on the following assumption being true.

The assumption is that a result of ideal spatial noise reduction and that of ideal temporal noise reduction agree with each other. Here, the "ideal" noise reduction means noise reduction which completely removes noise. In other words, the assumption is that, whether it is by spatial noise reduction or by temporal noise reduction, if noise components can be removed completely from a target pixel, an original pixel value with zero noise can be obtained as a result.

Figure 8:
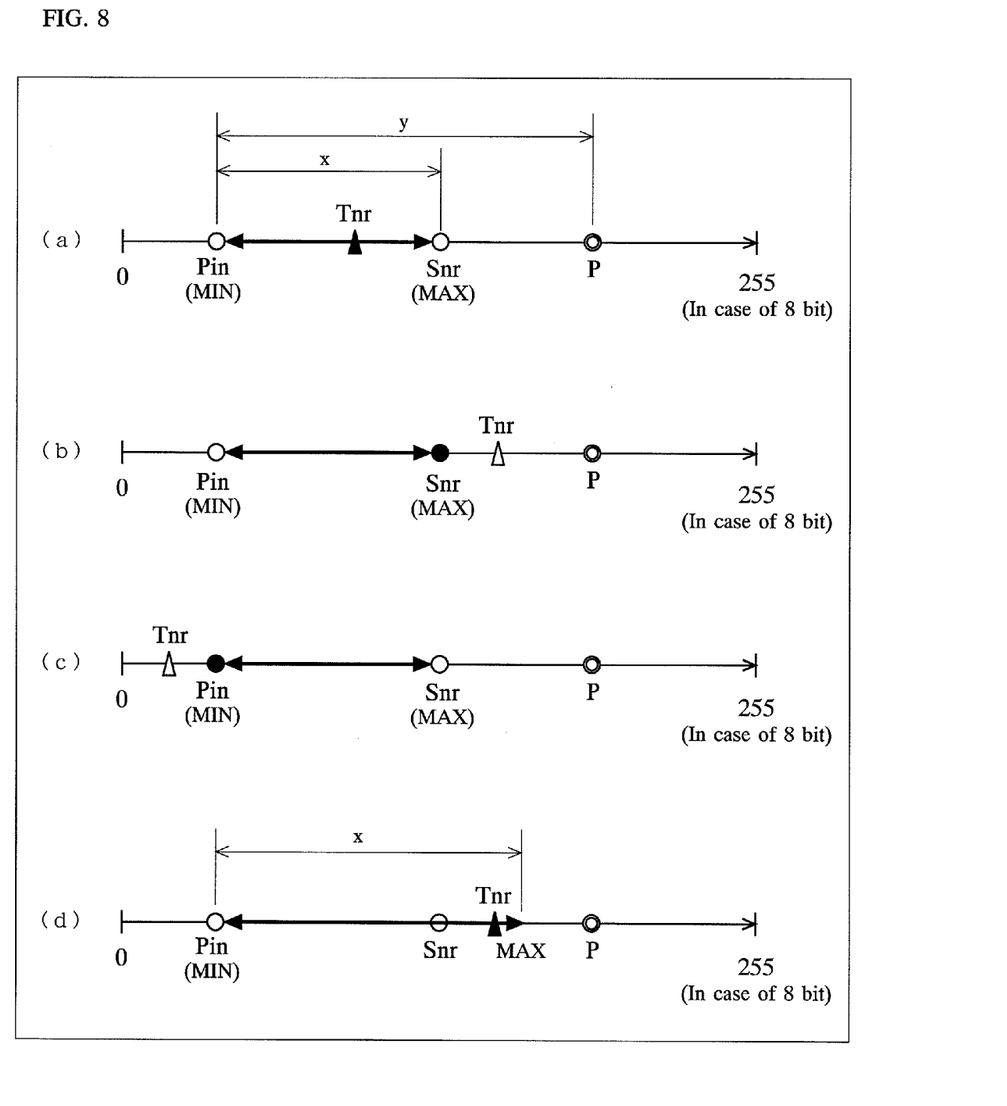
FIG. 8 is a diagram illustrating the concept of a process performed by the apparatus for reducing image noise according to the present invention.

In reality, the ideal noise reduction is hard to achieve and consequently a result of spatial noise reduction and that of temporal noise reduction hardly agree with each other. However, if both the spatial noise reduction and the temporal noise reduction act in the correct direction to reduce noise, both a pixel value obtained after spatial noise reduction and a pixel value obtained after temporal noise reduction are included in a range defined by a pixel value before noise reduction and an original pixel value obtained after complete noise removal. For easy understanding of the principle, FIG. 8 shows each pixel value on an axis. FIG. 8 illustrates a case where an input pixel value Pin is smaller than an original pixel value P due to noise components (the noise components have negative values).

According to the above interpretation, both the spatial NR pixel value Snr and the temporal NR pixel value Tnr are within a range y defined by the input pixel value Pin and the pixel value P. In the present invention, first a range x of pixel values is determined based on the input pixel value Pin (a minimum value MIN, in this example) and the spatial NR pixel value Snr (a maximum value MAX, in this example), and then whether the temporal NR pixel value Tnr falls within the range x is determined. If the temporal NR pixel value Tnr falls within the range x, both temporal noise reduction and spatial noise reduction are deemed to act in the correct direction to reduce noise, thus the temporal NR pixel value Tnr itself is outputted as an output result ((a) of FIG. 8). Also, when the temporal NR pixel value Tnr is greater than or equal to a maximum value MAX, which is an upper limit of the range x, both the temporal noise reduction and the spatial noise reduction are deemed to act in the correct direction to reduce noise. However, in such a case, because strong temporal noise reduction may generate residual images, the maximum value MAX is outputted as the output result ((b) of FIG. 8). On the other hand, when the temporal NR pixel value Tnr is less than or equal to a minimum value MIN, which is a lower limit of the range x, the temporal noise reduction and the spatial noise reduction are deemed to act in opposite directions, and thus both are determined to be less reliable and a minimum value MIN, which is a value before noise reduction, is outputted as the output result ((c) of FIG. 8).

In this manner, whether to apply a temporal noise reduction process is determined based on an input pixel value Pin before noise reduction and a relatively highly reliable spatial NR pixel value Snr with reduced spatial noise. Therefore, both preventing generation of residual images in a motion image area and performing strong temporal noise reduction on a moving image are possible in an optimum condition.

Figure 9:
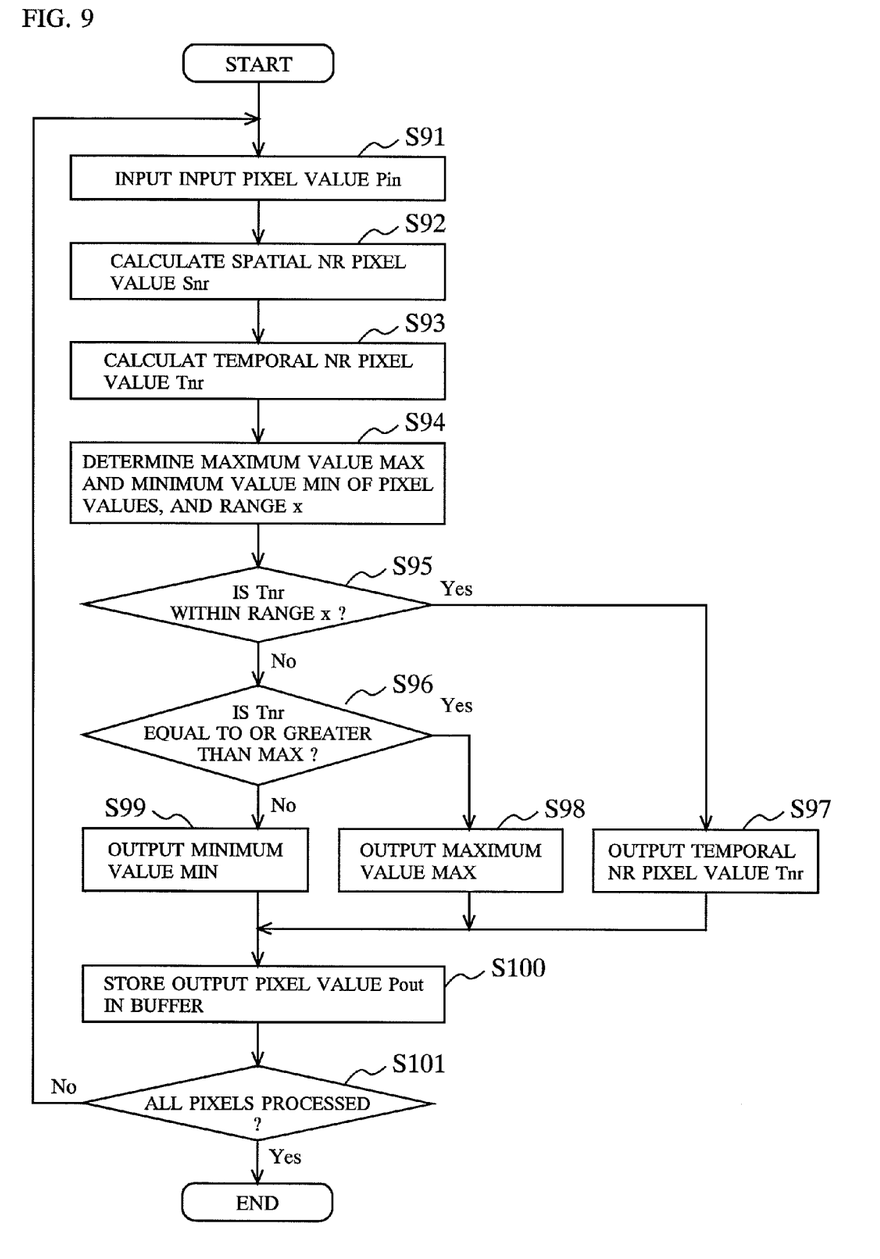
FIG. 9 is a flowchart illustrating a procedure of a method for reducing image noise according to the present invention.

FIG. 9 is a flowchart showing a procedure of a method in which the above-described apparatus for reducing image noise reduces image noise. FIG. 9 shows a procedure of processing pixels within one image frame. When a plurality of image frames are sequentially processed, the procedure shown in FIG. 9 may be repeated for respective image frames.

When an input pixel value Pin is inputted (S91), the spatial noise reducing section 20 calculates a spatial NR pixel value Snr obtained after reducing spatial noise from the input pixel value Pin (S92). In addition, the temporal noise reducing section 30 calculates a temporal NR pixel value Tnr obtained after reducing temporal noise from the input pixel value Pin (S93). Next, the temporal noise reduction result determining section 50 obtains a maximum value MAX and a minimum value MIN from the spatial NR pixel value Snr, the input pixel value Pin, and predetermined margin values to thereby determine a range x (S94). Next, the temporal noise reduction result determining section 50 compares the temporal NR pixel value Tnr and the range x (S95, S96). Then, the temporal noise reduction result determining section 50 outputs, as an output pixel value Pout, the temporal NR pixel value Tnr if MIN<Tnr<MAX (S97), the maximum value MAX if MAX≦Tnr (S98), and the minimum value MIN if Tnr≦MIN (S99). The output pixel value Pout is stored in the buffer 40 (S100). These processes are repeated for the pixels within one image frame (S101).

Figure 10:
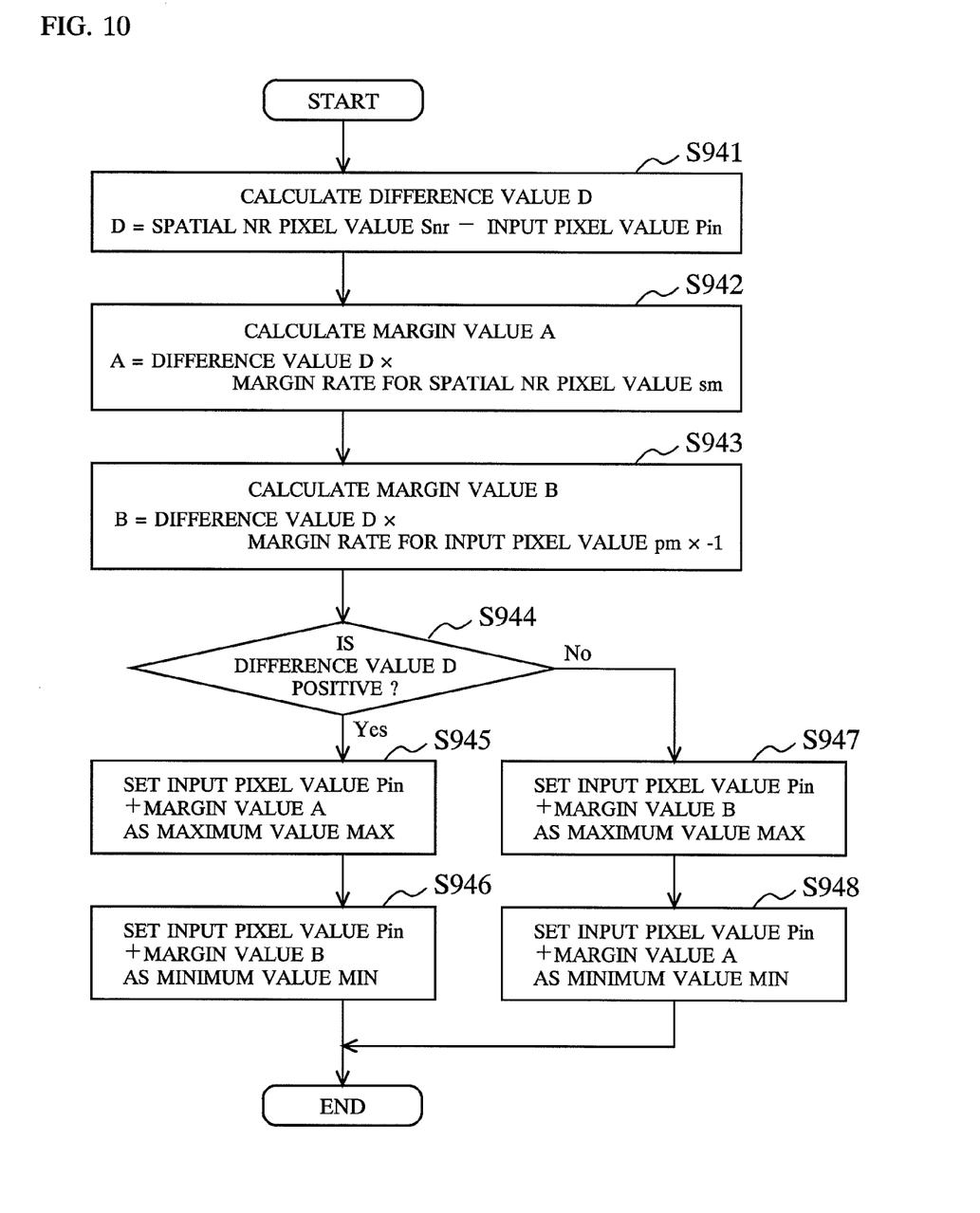
FIG. 10 is a flowchart illustrating a detailed procedure in step S94 in FIG. 9, which is performed by the pixel value range setting section 51 of the configuration example 4.

FIG. 10 is a flowchart illustrating a detailed procedure in step S94 in FIG. 9, in which the pixel value range setting section 51 (FIG. 6) according to the configuration example 4 sets the range x.

First, the difference value calculator 517 calculates a difference value D (=Snr−Pin) (S941). Next, the margin setting section 515 calculates a margin value A (=D×sm) by multiplying the difference value D by a margin rate for a spatial NR pixel value sm (positive value), and calculates a margin value B (=D×pm×−1) by multiplying the difference value D by a margin rate for an input pixel value pm (positive value) and by minus 1 (S942, S943). Then, the margin setting section 515 determines whether the sign of the difference value D is positive (S944). When the difference value D is positive, the margin setting section 515 outputs a value (=Pin+A) obtained by adding the margin value A to an input pixel value Pin as a maximum value MAX, and also outputs a value (=Pin+B) obtained by adding the margin value B to the input pixel value Pin as a minimum value MIN (S945, S946). When the difference value D is negative, the margin setting section 515 outputs a value (=Pin+B) obtained by adding the margin value B to the input pixel value Pin as a maximum value MAX, and also outputs a value (=Pin+A) obtained by adding the margin value A to the input pixel value Pin as a minimum value MIN (S947, S948).

As described above, the apparatus and the method for reducing image noise according to the embodiment of the present invention determines the reliability of a temporal noise reduction process based on an input pixel value Pin before noise reduction and a spatial NR pixel value Snr with reduced spatial noise. Accordingly, a temporal NR pixel value Tnr with reduced temporal noise can be outputted only when the reliability of the temporal noise reduction process is high. Thus, it is made possible to perform strong temporal noise reduction on a moving image while preventing generation of residual images in a motion image area.

Particularly in the configuration having the pixel value range setting section 51 according to each of configuration examples 2 to 4, different margin values can be set for a spatial NR pixel value Snr (a maximum value MAX) and an input pixel value Pin (a minimum value MIN). Thus, even when spatial noise reduction is performed, for the purpose of preventing image blurring, at a level that cannot allow complete noise removal, only a maximum value MAX which is used to determine the reliability of a temporal noise reduction result can be increased ((d) of FIG. 8). Thus, even when strong temporal noise reduction is performed on a moving image, it is possible to extend the range of application of a temporal noise reduction result while preventing generation of residual images in a motion image area.

Each of the configurations of the above-described apparatuses for reducing image noise is typically realized as an LSI which is an integrated circuit (referred to as an IC, a system LSI, a super LSI, or an ultra LSI, for example, depending on the integration degree). These configurations may be individually formed on a chip, or some or all of the components may be integrated on the chip. Further, the method of circuit-integration is not limited to the LSI, and the circuit-integration may be realized using dedicated circuits or general purpose processors. Furthermore, a FPGA (Field programmable Gate Array) that is programmable after the LSI is manufactured or a reconfigurable processor that can reconfigure connections and settings of a circuit cell within the LSI, may be used.

If a technology of circuit-integration that replaces the LSI is developed as a result of the advance in semiconductor technology or derivation from other technologies, certainly such a technology may be used to integrate the function blocks. Adoption of biotechnology may be one possibility.

INDUSTRIAL APPLICABILITY

An apparatus and a method for reducing image noise of the present invention are useful for imaging devices such as digital video cameras or digital still cameras which are capable of shooting moving images, and particularly useful, for example, for effectively reducing temporal noise in the moving images.

REFERENCE SIGNS LIST

10, 60 terminal
20 spatial noise reducing section
30 temporal noise reducing section
40 buffer
50 temporal noise reduction result determining section
51 pixel value range setting section
52 range determining section
511 MAX selector
512 MIN selector
513, 514 adder
515 margin setting section
516 difference absolute value calculator
517 difference value calculator
521 comparator
522 selector

The invention claimed is:

1. An apparatus for reducing image noise which reduces noise in an image, the apparatus comprising:
   a spatial noise reducing section that reduces noise from an input image by smoothing a pixel value in a spatial direction within a current image frame;
   a temporal noise reducing section that reduces noise from the input image by smoothing the pixel value in a temporal direction between the current image frame and a temporally preceding image frame;
   a pixel value range setting section that sets a pixel value range based on the pixel value of the input image and a pixel value of an image outputted by the spatial noise reducing section; and
   a range determining section that outputs: a pixel value of an image outputted by the temporal noise reducing section when the pixel value of the image outputted by the temporal noise reducing section is within the pixel value range; a maximum value of the pixel value range when the pixel value of the image outputted by the temporal noise reducing section is greater than the maximum value; and a minimum value of the pixel value range when the pixel value of the image outputted by the temporal noise reducing section is less than the minimum value.

2. The apparatus for reducing image noise according to claim 1, wherein
the pixel value range setting section includes:
a difference value calculating section that calculates a difference value between the pixel value of the input image and the pixel value of the image outputted by the spatial noise reducing section;
a margin setting section that obtains two margin values by multiplying a predetermined margin rate for spatial noise reduction and a predetermined margin rate for an input image each by the difference value; and
an adding section that, based on a sign of the difference value, adds one of the two margin values to the pixel value of the input image to obtain the maximum value of the pixel value range, and adds the other of the two margin values to the pixel value of the input image to obtain the minimum value of the pixel value range.

3. The apparatus for reducing image noise according to claim 1, wherein
the pixel value range setting section includes:
a selecting section that compares the pixel value of the input image and the pixel value of the image outputted by the spatial noise reducing section to select the maximum value and the minimum value of the pixel value range;
a margin setting section in which a margin value is predetermined; and
an adding section that adds the predetermined margin value to each of the maximum value and the minimum value of the pixel value range.

4. The apparatus for reducing image noise according to claim 3, wherein:
the pixel value range setting section further includes a difference absolute value calculating section that calculates the absolute value of the difference between the pixel value of the input image and the pixel value of the image outputted by the spatial noise reducing section; and
the margin setting section provides the adding section with a margin value obtained by multiplying the predetermined margin value by the absolute value of the difference.

5. A method for reducing image noise which reduces noise in an image, the method comprising:
a spatial noise reducing step of reducing noise from an input image by smoothing a pixel value in a spatial direction within a current image frame;
a temporal noise reducing step of reducing noise from the input image by smoothing the pixel value in a temporal direction between the current image frame and a temporally preceding image frame;
a range setting step of setting a pixel value range based on the pixel value of the input image and a pixel value of an image outputted in the spatial noise reducing step; and
a range determining step of outputting: a pixel value of an image outputted in the temporal noise reducing step when the pixel value of the image outputted in the temporal noise reducing step is within the pixel value range; a maximum value of the pixel value range when the pixel value of the image outputted in the temporal noise reducing step is greater than the maximum value; and a minimum value of the pixel value range when the pixel value of the image outputted in the temporal noise reducing step is less than the minimum value.

6. The method for reducing image noise according to claim 5, wherein
the range setting step includes:
a difference value calculating step of calculating a difference value between the pixel value of the input image and the pixel value of the image outputted in the spatial noise reducing step;
a margin setting step of obtaining two margin values by multiplying a predetermined margin rate for spatial noise reduction and a predetermined margin rate for an input image each by the difference value; and
an adding step of, based on a sign of the difference value, adding one of the two margin values to the pixel value of the input image to obtain the maximum value of the pixel value range, and adding the other of the two margin values to the pixel value of the input image to obtain the minimum value of the pixel value range.

7. An integrated circuit used for an apparatus for reducing image noise which reduces noise in an image, the integrated circuit comprising circuitry functioning as:
a spatial noise reducing section that reduces noise from an input image by smoothing a pixel value in a spatial direction within a current image frame;
a temporal noise reducing section that reduces noise from the input image by smoothing the pixel value in a temporal direction between the current image frame and a temporally preceding image frame;
a pixel value range setting section that sets a pixel value range based on the pixel value of the input image and a pixel value of an image outputted by the spatial noise reducing section; and
a range determining section that outputs: a pixel value of an image outputted by the temporal noise reducing section when the pixel value of the image outputted by the temporal noise reducing section is within the pixel value range; a maximum value of the pixel value range when the pixel value of the image outputted by the temporal noise reducing section is greater than the maximum value; and a minimum value of the pixel value range when the pixel value of the image outputted by the temporal noise reducing section is less than the minimum value.

* * * * *